(12) United States Patent
Araki et al.

(10) Patent No.: US 8,088,852 B2
(45) Date of Patent: Jan. 3, 2012

(54) OILY SURFACE ADHESIVE ROOM TEMPERATURE CURING TYPE ORGANOPOLYSILOXANE COMPOSITION AND SEAL

(75) Inventors: Tadashi Araki, Annaka (JP); Tsuneo Kimura, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 44 days.

(21) Appl. No.: 12/510,675

(22) Filed: Jul. 28, 2009

(65) Prior Publication Data

US 2010/0036034 A1 Feb. 11, 2010

(30) Foreign Application Priority Data

Aug. 8, 2008 (JP) ................. 2008-205059

(51) Int. Cl.
*C08K 7/10* (2006.01)
*C08L 83/04* (2006.01)
*C08L 83/06* (2006.01)
*C08L 83/08* (2006.01)

(52) U.S. Cl. ........ 524/261; 524/588; 524/430; 524/493; 528/15; 528/17; 525/50; 525/55

(58) Field of Classification Search ............ 524/261, 524/588, 430, 493, 425; 528/17, 15; 525/50, 525/55

See application file for complete search history.

(56) References Cited

U.S. PATENT DOCUMENTS

| 6,875,806 B2 * | 4/2005 | Araki et al. ............. 524/430 |
| 2002/0010251 A1 * | 1/2002 | Muramatsu et al. ......... 524/493 |
| 2004/0122199 A1 * | 6/2004 | Scheim et al. .......... 528/34 |
| 2006/0173126 A1 * | 8/2006 | Araki ................ 524/588 |
| 2006/0189736 A1 * | 8/2006 | Mori et al. ............. 524/404 |
| 2006/0217514 A1 * | 9/2006 | Araki et al. ............ 528/17 |
| 2007/0244287 A1 * | 10/2007 | Hatanaka et al. .......... 528/15 |
| 2007/0282061 A1 * | 12/2007 | Kimura et al. ........... 524/588 |

FOREIGN PATENT DOCUMENTS

| EP | 0 431 881 A2 | 6/1991 |
| EP | 0 431 881 A3 | 6/1991 |
| JP | 5-98160 | 4/1993 |
| JP | 8-176445 | 7/1996 |
| WO | WO 99/65979 | 12/1999 |

OTHER PUBLICATIONS

Webster's II New Riverside University Dictionary, Library of Congress Cataloging in Publication Data, Copyright 1984 by Houghton Mifflin Company.*

* cited by examiner

*Primary Examiner* — James J Seidleck
*Assistant Examiner* — Deve E Valdez
(74) *Attorney, Agent, or Firm* — Oblon, Spivak, McClelland, Maier & Neustadt, L.L.P.

(57) ABSTRACT

An oily surface adhesive room temperature curing type organopolysiloxane composition includes: (A) at least one of organopolysiloxanes represented by specific general formulas; (B) heavy calcium carbonate of which the surfaces have been treated with a fatty acid and/or paraffin treating agent; (C) an oil-absorbing carbon powder; (D) a silane represented by a specific general formula or a partial hydrolyzate; (E) a curing catalyst; and (F) an organic compound having one isocyanate group in its molecule.

31 Claims, No Drawings

OILY SURFACE ADHESIVE ROOM TEMPERATURE CURING TYPE ORGANOPOLYSILOXANE COMPOSITION AND SEAL

CROSS-REFERENCE TO RELATED APPLICATION

This non-provisional application claims priority under 35 U.S.C. §119(a) on Patent Application No. 2008-205059 filed in Japan on Aug. 8, 2008, the entire contents of which are hereby incorporated by reference.

TECHNICAL FIELD

The present invention relates to a room temperature curing type organopolysiloxane composition excellent in chemical resistance (especially, resistance to engine oil) and capable of giving a cured product excellent in oil surface adhesive properties, and particularly relates to an oil surface adhesive room temperature curing type organopolysiloxane composition of which a cured product shows good adhesive strength and cohesive failure on an adherend having an adhesive interface fouled with a machine oil, a cutting oil, a turbine oil, an engine oil, a gear oil or the like and which is therefore useful as an automotive FIPG material. The present invention also relates to a seal composed of a cured product of the organopolysiloxane composition.

BACKGROUND ART

For sealing in the vicinity of an automotive engine, hitherto, there have been used oil-resistant gasket and packing members formed from cork, organic rubber, asbestos or the like. These members, however, are disadvantageous in that the inventory control and working process thereof are troublesome and that they are unreliable in sealing performance. In view of this, for such a use, an FIPG (Formed In Place Gaskets) system utilizing a cured product of a room temperature curing type silicone rubber composition has come to be adopted, whereby high evaluations have been obtained as to workability, hermetic seal properties, and heat resistance.

However, the known room temperature curing type organopolysiloxane compositions have the drawback that their cured products are insufficient in adhesion to oily surfaces. For instance, at the time of forming or punching an engine block, an oil pan or the like, deposition of a machine oil, a cutting oil, a turbine oil or the like occurs inevitably. In addition, after the room temperature curing type organopolysiloxane composition is applied to an engine block and before it is completely cured, an engine oil or the like may be poured into the engine block. Besides, in the case of a transmission (ATF (automatic transmission), CVT (continuously variable transmission)), the adherend surface may be fouled with an oil after assembly test. Therefore, due to the presence of the oily matter at the adhesive interface between the room temperature curing type organopolysiloxane composition and the engine block, the cured product functioning as a seal member may be defective in adhesion. Although this problem may be solved to a certain extent by thorough cleaning of the adhesive interface, the cleaning step takes considerable time and, hence, makes it difficult to carry out the engine assembling process in the same manner as before.

On the other hand, examples of a room temperature curing type organopolysiloxane composition somewhat improved in adhesion to oily surfaces are proposed in JP-A 5-98160 and JP-A 8-176445. In the former proposal, however, it is difficult to obtain good oily surface adhesive property, especially, good cohesive failure unless an oil-absorbing carbon powder is used as a filler in a large amount; besides, such a composition is so high in viscosity and thixotropy that the desired product is difficult to obtain. In addition, the high loading with the oil-absorbing carbon powder leads to easy absorption of the engine oil or the like into the cured product, so that a conspicuous lowering in hardness may be confirmed after the absorption of the engine oil. Moreover, the oil-absorbing carbon powder would absorb the silicone oil with time, causing the oily surface adhesion performance to be lowered with time. In the latter proposal, iminoxysilane is used as a crosslinking agent. The use of this curing agent results in that the curing type is limited to the deoxime type, which means poorness in general-purpose properties. In addition, even with such a curing agent used, it is difficult to obtain sufficient oily surface adhesive properties, particularly satisfactory cohesive failure, as comparable to that in the case of JP-A 5-98160.

SUMMARY OF THE INVENTION

The present invention has been made in consideration of the above circumstances. Accordingly, it is an object of the present invention to provide a room temperature curing type organopolysiloxane composition capable of giving a cured product excellent in chemical resistance (particularly, resistance to engine oil) and excellent in adhesion to an oily surface, and a seal composed of a cured product of the composition.

In order to attain the above object, the present inventors have made intensive and extensive investigations. As a result of their investigations, they have found out that a composition in which at least one of organopolysiloxanes represented by the following general formulas (1) to (4) is used as a base oil and specific heavy calcium carbonate and a specific oil-absorbing carbon powder are used together as fillers can be cured to be a cured product showing a sufficient oily surface adhesion performance (especially, coefficient of cohesive failure). Further, it was found out when an organic compound having one isocyanate group in its molecule is added to the composition, the oily surface adhesion performance of the cured product can be prevented from being lowered with time and its chemical resistance (particularly, resistance to engine oil) can be enhanced drastically. Based on the findings, the present invention has been completed.

According to the present invention, there is provided an oily surface adhesive room temperature curing type organopolysiloxane composition, including:

(A) 100 parts by weight of at least one selected from the group consisting of organopolysiloxanes represented by the following general formulas (1) to (4),

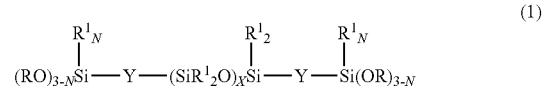

wherein R is a methyl or ethyl group, $R^1$ is a unsubstituted or substituted monovalent hydrocarbon group of 1 to 10 carbon atoms, X is an integer of at least 10, Y is an oxygen atom or an alkylene group of 1 to 5 carbon atoms, and numbers N are each independently an integer of 0 or 1,

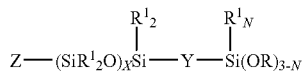

wherein R, R¹, X, Y, and N are the same as above, and Z is an alkenyl group of 2 to 5 carbon atoms,

wherein R, R¹, X, Y and N are the same as above, d is an integer of 1 to 10, and R² is a branched group containing a hydrolyzable group represented by the following general formula,

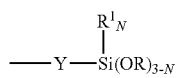

wherein R, R¹, Y and N are the same as above,

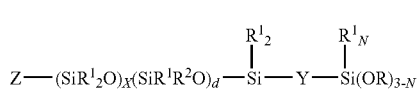

wherein R, R¹, R², X, Y, Z, N and d are the same as above;
(B) 10 to 150 parts by weight of heavy calcium carbonate surface treated with a fatty acid and/or paraffin treating agent;
(C) 1 to 30 parts by weight of an oil-absorbing carbon powder;
(D) 1 to 25 parts by weight of a silane represented by the following general formula (5), $$R^3_{4-n}SiK_n \quad (5)$$

wherein R³ is independently an unsubstituted or substituted monovalent hydrocarbon group, K is a hydrolyzable group, and n is an integer of 3 or 4, or a partial hydrolyzate;
(E) 0.01 to 15 parts by weight of a curing catalyst; and
(F) 0.1 to 10 parts by weight of an organic compound having one isocyanate group in its molecule.

In the room temperature curing type organopolysiloxane composition as above, preferably, the oil-absorbing carbon powder of component (C) is an acetylene black powder having an average particle diameter of 30 to 50 nm, a specific surface area of 30 to 80 m²/g according to BET-N₂ adsorption method, and a DBP oil absorption of 130 to 200 ml/100 g.

In addition, the room temperature curing type organopolysiloxane composition as above, preferably, further includes (G) 0.1 to 100 parts by weight of a non-reactive silicone oil based on 100 parts by weight of component (A).

According to the present invention, there is also provided a seal obtained by curing the room temperature curing type organopolysiloxane composition as above.

Advantageous Effects of Invention

In accordance with the present invention, there is obtained a room temperature curing type organopolysiloxane composition which gives a cured product excellent in chemical resistance (especially, resistance to engine oil) and excellent in adhesion to an oily surface. The cured product of the composition is effective for use as a seal, particularly, a seal member for automotive application and architectural application.

DESCRIPTION OF EMBODIMENTS

Component (A) used in the present invention serves as a base polymer of the composition. In the case of preparing a dealcoholization type room temperature curing organopolysiloxane composition, there is fear about the preservation stability of the uncured composition, and, accordingly, at least one selected from the group consisting of organopolysiloxanes represented by the following general formulas (1) to (4) is used as component (A).

wherein R is a methyl or ethyl group, R¹ is a unsubstituted or substituted monovalent hydrocarbon group of 1 to 10 carbon atoms, X is an integer of at least 10, Y is an oxygen atom or an alkylene group of 1 to 5 carbon atoms, and numbers N are each independently an integer of 0 or 1;

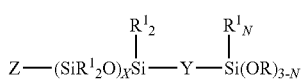

wherein R, R¹, X, Y, and N are the same as above, and Z is an alkenyl group of 2 to 5 carbon atoms;

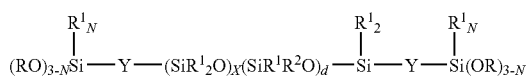

wherein R, R¹, X, Y and N are the same as above, d is an integer of 1 to 10, and R² is a branched group containing a hydrolyzable group represented by the following general formula,

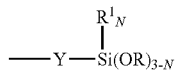

wherein R, R¹, Y and N are the same as above; and

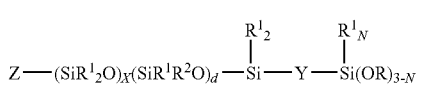

wherein R, R¹, R², X, Y, Z, N and d are the same as above.
A preferable viscosity of component (A) at a temperature of 25° C. is 1,000 to 300,000 mPa·s. If the viscosity is below 1,000 mPa·s, the elastomer upon curing of the composition may fail to show excellent physical properties, particularly, flexibility and impact resistance. On the other hand, if the viscosity is above 300,000 mPa·s, the viscosity of the composition may be so high as to show a markedly lowered fluidity. Accordingly, the viscosity of component (A), more preferably, is 5,000 to 100,000 mPa·s. Incidentally, the viscosity value is a value measured by a rotational viscometer, here and hereafter.

In the above general formulas, R is a methyl group or an ethyl group, of which preferred is the methyl group. $R^1$ is a substituted or unsubstituted monovalent hydrocarbon group of 1 to 10 carbon atoms, particularly 1 to 6 carbon atoms, for example, an alkyl group such as methyl, ethyl, propyl, etc., a cycloalkyl group such as cyclohexyl, etc., or a group obtained by partial substitution of hydrogen atoms in these groups by a halogen atom or the like, such as 3,3,3-trifluoropropyl. Among these groups, preferred are methyl, ethyl, vinyl, phenyl and 3,3,3-trifluoropropyl groups, and particularly preferred is the methyl group. The plurality of $R^1$ groups in the above general formulas (2) to (4) may be the same or different.

In addition, Y is an oxygen atom or an alkylene group of 1 to 5 carbon atoms. Examples of the alkylene group include methylene, ethylene, propylene and butylenes groups, among which the ethylene group is specifically preferred. Further, Z is an alkenyl group of 2 to 5 carbon atoms. Examples of the alkenyl group include vinyl, allyl, butenyl, and pentenyl groups, among which the vinyl group is the most preferable.

Of the organopolysiloxanes represented by the general formulas (1) to (4), preferred are the organopolysiloxanes of the general formula (1) and the organopolysiloxanes of the general formula (3). The organopolysiloxane of the general formula (2) is preferably used together with the organopolysiloxane of the general formula (1), and the organopolysiloxane of the general formula (4) together with the organopolysiloane of the general formula (3). In that case, the proportion of the organopolysiloxane of the general formula (2) or the organopolysiloxane of the general formula (4) blended as component (A) is preferably not more than 50 weight %, particularly not more than 30 weight %.

Heavy calcium carbonate as component (B) is a component for imparting good workability to the composition of the present invention and for obtaining sufficient oily surface adhesive properties, particularly good cohesive failure.

For obtaining sufficient adhesion to an oily surface, it is necessary for component (B) to have surfaces treated with a fatty acid and/or paraffin treating agent. In addition, the air permeation method specific surface area of component (B) is preferably 0.5 to 2.5 m²/g, particularly 0.7 to 2.3 m²/g. Incidentally, in the case of the composition in which colloidal calcium carbonate is used, the oily surface adhesive properties obtained are lower and the workability or the like is also lower, as compared with the composition in which heavy calcium carbonate is used. As the heavy calcium carbonate, the commercially available ones can be used, for example, MC COAT P-20 and MC COAT S-20, produced by Maruo Calcium Co., Ltd.

The amount of component (B) added is 10 to 150 parts by weight, preferably 30 to 80 parts by weight, based on 100 parts by weight of the organopolysiloxane of component (A). Use of component (B) in too large an amount leads to a lowered resin adhesive property and a raised viscosity of the composition, resulting in bad ejection properties at the time of mixing and application of the composition. On the other hand, too small an amount of component (B) leads to an insufficient oily surface adhesive property, particularly a marked lowering in the coefficient of cohesive failure.

The oil-absorbing carbon powder of component (C) is a component for providing the composition with favorable oily surface adhesive properties, particularly good adhesive strength and good cohesive failure. Specific examples of the oil-absorbing carbon powder as component (C) include porous carbon powders such as activated carbon, etc., and carbon blacks such as Ketjen black, channel black, furnace black, acetylene black, etc., which may be used either singly or in combination of two or more of them.

Of the above-mentioned carbon blacks, preferred are acetylene black powders, among which the most preferable is the one that is as highly powdery as possible in form.

Preferably, the acetylene black powder has an average particle diameter of 30 to 50 nm, a BET-$N_2$ specific surface area as measured by the adsorption method of 30 to 80 m²/g, and a DBP oil absorption of 130 to 200 ml/100 g. More preferably, the acetylene black powder has an average particle diameter of 30 to 40 nm, a specific surface area of 50 to 80 m²/g, and a DBP oil absorption of 150 to 190 ml/100 g. As the oil-absorbing carbon powder of component (C), also, the commercially available ones can be used, for example, DENKA BLACK, produced by Denki Kagaku Kogyo Kabushiki Kaisha. Incidentally, in the present invention, the average particle diameter can be determined as a weight average value (or median diameter) by a laser beam diffraction method, for example, and the DBP oil absorption can be measured according to JIS K6221.

The amount of component (C) added is 1 to 30 parts by weight, preferably 5 to 20 parts by weight, based on 100 parts by weight of the organopolysiloxane of component (A). Use of component (C) in too large an amount leads to a raised viscosity of the composition, resulting in poor ejection properties at the time of mixing and application of the composition. On the other hand, too small an amount of component (C) makes it impossible to obtain sufficient oily surface adhesive properties, particularly good adhesive strength and good cohesive failure, and may result in that the composition itself is lowered in thixotropy and flows.

Component (D) is a silane represented by the following general formula (5):

$$R^3_{4-n}SiK_n \qquad (5)$$

wherein $R^3$ is independently an unsubstituted or substituted monovalent hydrocarbon group, K is a hydrolyzable group, and n is an integer of 3 or 4, or a partial hydrolyzate thereof, which functions as a crosslinking agent in the composition according to the present invention.

The $R^3$ in the above general formula (5) is the independently an unsubstituted or substituted monovalent hydrocarbon group such as alkyl, alkenyl and haloalkyl groups of preferably 1 to 10 carbon atoms, particularly 1 to 8 carbon atoms. Among these groups, preferred are methyl, ethyl, propyl, vinyl, phenyl and trifluoropropyl groups, and particularly preferred are methyl, ethyl, vinyl and phenyl groups. In addition, K is a hydrolyzable group. Examples of the hydrolyzable group K include: alkoxyl groups such as methoxyl, ethoxyl and propoxyl groups; isopropenoxyl group; alkenyloxime groups such as 1-ethyl-2-methylvinyloxime group; ketoxime groups such as dimethyl ketoxime group and methyl ethyl ketoxime group; acyloxyl groups such as acetoxyl group, propionoxyl group, butyroyloxyl group, and benzoyloxime group; amino groups such as dimethylamino group and diethylamino group; aminoxyl groups such as dimethylaminoxyl group and diethylaminoxyl group; and amide groups such as N-methylacetamide group, N-ethylacetamide group and N-methylbenzamide group. Among these groups, preferred are alkoxyl groups, and particularly preferred are methoxyl group and ethoxyl group. Besides, n is an integer of 3 or 4.

Specific examples of component (D) as above include ethyl silicate, propyl silicate, methyltrimethoxysilane, methyltriethoxysilane, vinyltrimethoxysilane, vinyltriethoxysilane, methyltris(methoxyethoxy)silane, vinyltris(methoxyethoxy) silane, methyltripropenoxysilane, methyltriacetoxysilane, vinyltriacetoxysilane, methyltri(butanoxime)silane, vinyltri (butanoxime)silane, phenyltri(butanoxime)silane, propyltri (butanoxime)silane, tetra(butanoxime)silane, 3,3,3-trifluoropropyl(butanoxime)silane, 3-chloropropyl(butanoxime) silane, methyltri(propanoxime)silane, methyltri (pentanoxime)silane, methyltri(isopentanoxime)silane, vinyl (cyclopentanoxime)silane, methyltri(cyclohexanoxime) silane, and partial hydrolyzates thereof.

The crosslinking agent of component (D) may be either a silane or a siloxane obtained by partial hydrolysis thereof. The siloxane may be a straight chain, a branched chain or cyclic in molecular structure. These crosslinking agents may be used either singly or in combination of two or more of them.

The amount of component (D) blended is 1 to 25 parts by weight, preferably 3 to 15 parts by weight, based on 100 parts by weight of the organopolysiloxane of component (A). If the amount of component (D) is less than 1 part by weight, the composition would be gelled during preparation or storage thereof, or the elastic body obtained from the composition would not show the desired physical properties. If the amount is more than 25 parts by weight, on the other hand, the shrinkage factor of the composition at the time of curing would be large, and the cured product would be lowered in elasticity. Therefore, the amount of component (D) blended should be in the range of 1 to 25 parts by weight.

The curing catalyst of component (E) is for exhibiting a catalytic action on a condensation reaction between the base oil of component (A) and the hydrolyzable crosslinking agent of component (D) in the composition according to the present invention. Specific examples of the curing catalyst of component (E) include: organic acid metal salts such as iron octoate, iron naphthenate, cobalt octoate, cobalt naphthenate, tin octoate, tin naphthenate, lead octoate and lead naphthenate; alkyltin ester compounds such as dibutyltin diacetate, dibutyltin dilaurate and dibutyltin dioctoate; tin halide compounds; tin orthoester compounds; metal alcoholates such as tetrabutyl titanate and tetrabutyl zirconate; titanium chelates such as diisopropoxybis(acetylacetonato)titanium and diisopropoxybis(ethylacetoacetato)titanium; and amines such as diethylhydroxylamine and dimethylhydroxylamine.

These curing catalysts of component (E) may be used either singly or in combination of two or more of them. The amount of component (E) blended is 0.01 to 15 parts by weight, preferably 0.05 to 5 parts by weight, based on 100 parts by weight of the organopolysiloxane of component (A). If the amount of component (E) is less than 0.01 part by weight, it would take a long time for a tack-free film to be formed upon exposure of the composition to air, and the inside curing properties would be poor. On the other hand, if the amount is more than 15 parts by weight, the film forming time would be as short as several seconds, leading to poor workability, and the heat resistance of the cured product would be lowered.

The organic compound having one isocyanate group in its molecule used as component (F) is, together with components (B) and (C), an important component for enhancing the time stability of oily surface adhesive properties of, and the chemical resistance (especially, resistance to engine oil) of, the room temperature curing type organopolysiloxane composition according to the present invention. It is considered that NH groups, SH groups or the like contained in chemicals (here, engine oil is mentioned as an example) react with the organic compound having one isocyanate group in its molecule, to form the urethane bond or thiourethane bond, whereby the hardness and other physical properties of the cured product can be maintained. In addition, since the isocyanate group is a good hydroxyl group-trapping agent, it enhances the time stability of the composition, resulting in that the oily surface adhesion performance can be stabilized.

The organic compound having one isocyanate group in its molecule is not particularly limited, insofar as it has one isocyanate group in its molecule. This organic compound may be an organic silicon compound having one isocyanate group in its molecule. In the present invention, it is important that the organic compound has one isocyanate group in its molecule. If the organic compound has two or more isocynate groups in its molecule, when an organic compound having two NH groups or SH groups in its molecule is present the isocyanate group-containing molecules are linked together through the urethane bond or thiourethane bond, with the result that the rubber becomes brittle and becomes poor in adhesive properties.

As the organic compound having one isocyanate group in its molecule, those which have been known can be used. Specific examples of the organic compound which can be used include organic compounds such as ethyl isocyanate, isopropyl isocyanate, propyl isocyanate, butyl isocyanate, sec-butyl isocyanate, tert-butyl isocyanate, phenyl isocyanate, benzyl isocyanate, cyclopentyl isocyanate, cyclohexyl isocyanate, p-tolyl isocyanate, etc., and organic silicon compounds such as 3-isocyanatopropyltrimethoxysilane, 3-isocyanatopropyltriethoxysilane, etc.

The organic compound having one isocyanate group in its molecule is blended in an amount of 0.1 to 10 parts by weight, preferably 0.5 to 5 parts by weight, based on 100 parts by weight of component (A). If the amount of this organic compound is less than 0.1 part by weight, it would be impossible to maintain sufficient oily surface adhesive properties with time or to obtain a good chemical resistance performance. An amount of more than 10 parts by weight, on the other hand, leads to a raised cost and lowered oily surface adhesive properties.

The room temperature curing type organopolysiloxane composition according to the present invention, preferably, is admixed with (G) a non-reactive silicone oil, more preferably a polydimethylsiloxane terminated with the trimethylsilyl group at both ends of its molecule. Admixed with component (G), the composition is improved in such properties as workability and thread breakage properties, and the rubber properties after curing can be regulated.

The component (G) preferably has a viscosity (25° C.) of 5 to 50,000 mPa·s, particularly 50 to 5,000 mPa·s. The amount of component (G) blended is preferably 0.1 to 100 parts by weight, particularly 5 to 80 parts by weight, based on 100 parts by weight of component (A).

The room temperature curing type organopolysiloxane composition according to the present invention, containing the above-mentioned components (A) to (F) and optionally containing component (G), may further be admixed, if necessary, with a particulate inorganic filler for the purpose of imparting required mechanical properties to the rubber-like elastic body upon curing. Examples of the inorganic filler include fine quartz powder, aerosol silica, precipitated silica, aerosol titanium dioxide, diatomaceous earth, aluminum hydroxide, particulate alumina, magnesia, zinc oxide, zinc carbonate, and materials obtained by treating surfaces of these filler materials with any of silanes, silazanes, low polymerization degree siloxanes, organic compounds and the like. Furthermore, the room temperature curing type organopolysiloxane composition of the present invention may be admixed with organic solvent, mildew proofing agent, flame retarder, heat resisting agent, plasticizer, thixotropic agent, adhesion accelerator, curing accelerator, pigment or the like.

The room temperature curing type organopolysiloxane according to the present invention can be obtained by mixing components (A) to (F) and, optionally, component (G) and various additives in a moisture-shielded condition. The composition thus obtained can be used as a so-called one-pack type room temperature curing organosiloxane composition, which is preserved as it is in a closed vessel and which will be cured into a rubber-like elastic body by exposure to moisture in air when put to use.

The composition according to the present invention is effective for use as a sealing material, particularly a sealing material for automotive application and architectural application.

EXAMPLES

Now, the present invention will be described specifically below, showing Examples and Comparative Examples, but the invention is not to be limited to or by the examples. In the following examples, the viscosity values are values measured at 25° C. by use of a rotational viscometer.

Example 1

Into 100 parts by weight of a dimethylpolysiloxane terminated by the trimethoxysilyl group by way of the ethylene group at both ends of the molecular chain thereof and having a viscosity of 50,000 mPa·s, 60 parts by weight of heavy calcium carbonate whose particle surfaces had been treated with a paraffin treating agent (trade name: MC COAT P-20, produced by Maruo Calcium Co., Ltd., air permeation method specific surface area: 0.8 to 2.0 m$^2$/g) and 15 parts by weight of an acetylene black powder (trade name: DENKA BLACK (Powder), produced by Denki Kagaku Kogyo Kabushiki Kaisha, having an average particle diameter of 35 nm, a BET specific surface area of 68 m$^2$/g, and a DBP oil absorption of 175 ml/100 g) were dispersed and mixed until a uniform mixture was obtained. Then, the uniform mixture was admixed with 5 parts by weight of methyltrimethoxysilane, 2 parts by weight of diisopropoxybis(acetylacetonato) titanium, and 2 parts by weight of 3-isocyanatopropyltriethoxysilane, followed by thorough mixing under a reduced pressure, to obtain a composition.

Example 2

Into 100 parts by weight of a dimethylpolysiloxane terminated by the trimethoxysilyl group at both ends of the molecular chain thereof and having a viscosity of 50,000 mPa·s plus 20 parts by weight of a dimethylpolysiloxane terminated by the trimethylsilyl group at both ends thereof and having a viscosity of 1,000 mPa·s, 60 parts by weight of heavy calcium carbonate whose particle surfaces had been treated with a paraffin treating agent (trade name: MC COAT P-20, produced by Maruo Calcium Co., Ltd., air permeation method specific surface area: 0.8 to 2.0 m$^2$/g) and 15 parts by weight of an acetylene black powder (trade name: DENKA BLACK (Powder), produced by Denki Kagaku Kogyo Kabushiki Kaisha, having an average particle diameter of 35 nm, a BET specific surface area of 68 m$^2$/g, and a DBP oil absorption of 175 ml/100 g) were dispersed and mixed until a uniform mixture was obtained. Then, the uniform mixture was admixed with 5 parts by weight of methyltrimethoxysilane, 2 parts by weight of diisopropoxybis(acetylacetonato)titanium and 2 parts by weight of 3-isocyanatopropyltriethoxysilane, followed by thorough mixing under a reduced pressure, to obtain a composition.

Example 3

Into 100 parts by weight of a dimethylpolysiloxane terminated by the trimethoxysilyl group by way of the ethylene group at both ends of the molecular chain thereof and having a viscosity of 50,000 mPa·s plus 20 parts by weight of a dimethylpolysiloxane terminated by the trimethylsilyl group at both ends thereof and having a viscosity of 1,000 mPa·s, 60 parts by weight of heavy calcium carbonate whose particle surfaces had been treated with a paraffin treating agent (trade name: MC COAT P-20, produced by Maruo Calcium Co., Ltd., air permeation method specific surface area: 0.8 to 2.0 m$^2$/g) and 15 parts by weight of an acetylene black powder (trade name: DENKA BLACK (Powder), produced by Denki Kagaku Kogyo Kabushiki Kaisha, having an average particle diameter of 35 nm, a BET specific surface area of 68 m$^2$/g, and a DBP oil absorption of 175 ml/100 g) were dispersed and mixed until a uniform mixture was obtained. Then, the uniform mixture was admixed with 5 parts by weight of methyltrimethoxysilane, 2 parts by weight of diisopropoxybis(acetylacetonato)titanium and 2 parts by weight of 3-isocyanatopropyltriethoxysilane, followed by thorough mixing under a reduced pressure, to obtain a composition.

Example 4

Into 100 parts by weight of a dimethylpolysiloxane terminated by the trimethoxysilyl group by way of the ethylene group at both ends of the molecular chain thereof and having a viscosity of 50,000 mPa·s plus 20 parts by weight of a dimethylpolysiloxane terminated by the trimethylsilyl group at both ends thereof and having a viscosity of 1,000 mPa·s, 60 parts by weight of heavy calcium carbonate whose particle surfaces had been treated with a paraffin treating agent (trade name: MC COAT P-20, produced by Maruo Calcium Co., Ltd., air permeation method specific surface area: 0.8 to 2.0 m$^2$/g) and 15 parts by weight of an acetylene black powder (trade name: DENKA BLACK (Powder), produced by Denki Kagaku Kogyo Kabushiki Kaisha, having an average particle diameter of 35 nm, a BET specific surface area of 68 m$^2$/g, and a DBP oil absorption of 175 ml/100 g) were dispersed and mixed until a uniform mixture was obtained. Then, the uniform mixture was admixed with 5 parts by weight of methyltrimethoxysilane, 2 parts by weight of diisopropoxybis (acetylacetonato)titanium and 1 part by weight of phenyl isocyanate, followed by thorough mixing under a reduced pressure, to obtain a composition.

Comparative Example 1

A composition was obtained by the same technique as in Example 2, except that the heavy calcium carbonate whose particle surfaces had been treated with a paraffin treating agent, used in Example 2, was not used.

Comparative Example 2

A composition was obtained by the same technique as in Example 2, except that the acetylene black powder was not used.

Comparative Example 3

A composition was obtained by the same technique as in Example 2, except that the heavy calcium carbonate whose particle surfaces had been treated with a paraffin treating agent, used in Example 2, was used in an amount of 200 parts by weight.

Comparative Example 4

It was attempted to obtain a composition by the same technique as in Example 2, except that the acetylene black powder used in Example 2 was to be used in an amount of 35 parts by weight, but the intended composition could not be prepared successfully.

Comparative Example 5

A composition was obtained by the same technique as in Example 2, except that γ-glycidoxypropyltrimethoxysilane was used in place of 3-isocyanatopropyltriethoxysilane used in Example 2.

Comparative Example 6

A composition was obtained by the same technique as in Example 4, except that diphenylmethane diisocyanate was used in place of phenyl isocyanate used in Example 4.

Each of the room temperature curing type organopolysiloxane compositions (silicone rubber compositions) prepared above was poured into a 2 mm-deep form, and was cured at 23° C. and 50% RH for 7 days, to obtain a 2 mm-thick rubber sheet. Tack-free time and slump properties (fluidity) were measured according to the methods specified in JIS A5758, and the physical properties of each 2 mm-thick rubber sheet were measured according to JIS K6249.

In addition, by using each composition with an adherend (aluminum) having a width of 25 mm and a length of 100 mm, curing of the composition was carried out at 23° C. and 50% RH for 7 days, to obtain a shear adhesion test specimen having an adhesion area of 2.5 mm$^2$ and an adhesion thickness of 1 mm. Further, an adherend (aluminum, 25 mm wide and 100 mm long) cleaned with toluene was coated with an engine oil in a coating amount of 5 to 7 g/m$^2$, and then each room temperature curing type organosiloxane composition was applied thereto in an area of 2.5 mm$^2$ and a thickness of 1 mm. Onto this assembly, an adherend (aluminum, 25 mm wide and 100 mm long) coated with the engine oil in a coating amount of 5 to 7 g/m$^2$ was put, and curing at 25° C. and 50% RH was carried out for 7 days, to obtain an oily surface shear adhesion test specimen. Each shear adhesion test specimen was subjected to measurement of shear adhesive force and coefficient of cohesive failure, and each oily surface shear adhesion test specimen was subjected to measurement of oily surface shear adhesive force and coefficient of cohesive failure on oily surface, according to JIS K6850.

Besides, after each room temperature curing type organopolysiloxane composition was preserved at normal temperature for 6 months, the above-mentioned various tests were carried out. Furthermore, in order to check the chemical resistance performance of the cured product of the room temperature curing type organopolysiloxane composition obtained, the rubber sheets and the shear adhesion test specimens were immersed in the engine oil at 120° C. for 10 days, and the various tests were conducted in the same manner as above.

The results are shown in Table 1 below.

TABLE 1

| | | Example | | | | Comparative Example | | | | | |
|---|---|---|---|---|---|---|---|---|---|---|---|
| | | 1 | 2 | 3 | 4 | 1 | 2 | 3 | 4 | 5 | 6 |
| Initial physical properties | Tack-free time (min) | 6 | 10 | 17 | 7 | 9 | 35 | 5 | Not producable | 6 | 6 |
| | Slump property (mm) | 0 | 0 | 0 | 0 | 0 | Dropped | 0 | | 0 | 0 |
| | Hardness (Durometer A) | 50 | 38 | 39 | 38 | 25 | 27 | 52 | | 36 | 43 |
| | Elongation at break (%) | 350 | 300 | 340 | 460 | 350 | 280 | 150 | | 340 | 400 |
| | Tensile strength (MPa) | 2.0 | 2.1 | 2.2 | 2.4 | 1.5 | 1.3 | 3.5 | | 2.0 | 2.4 |
| | Shear adhesive force (MPa) | 2.2 | 2.4 | 2.3 | 2.4 | 1.5 | 1.1 | 2.7 | | 2.1 | 2.0 |
| | Coefficient of cohesive failure (%) | 100 | 100 | 100 | 100 | 100 | 100 | 70 | | 100 | 100 |
| | Adhesion to oily surface (MPa) | 2.0 | 2.3 | 2.1 | 2.0 | 0.3 | 0.5 | 1.0 | | 2.0 | 2.1 |
| | Coefficient of cohesive failure on oily surface (%) | 100 | 100 | 100 | 100 | 10 | 20 | 10 | | 100 | 100 |
| After storage at normal temperature for 6 months | Tack-free time (min) | 7 | 9 | 17 | 10 | 10 | 60 | 3 | Not measurable | 7 | 10 |
| | Hardness (Durometer A) | 50 | 38 | 38 | 38 | 20 | 20 | 40 | | 39 | 45 |
| | Elongation at break (%) | 370 | 360 | 350 | 370 | 370 | 300 | 170 | | 400 | 280 |
| | Tensile strength (MPa) | 2.4 | 2.8 | 2.5 | 2.4 | 1.7 | 1.3 | 3.2 | | 2.6 | 2.3 |
| | Shear adhesive force (MPa) | 2.3 | 2.6 | 2.5 | 2.6 | 1.5 | 1.0 | 2.5 | | 2.5 | 2.6 |
| | Coefficient of cohesive failure (%) | 100 | 100 | 100 | 100 | 100 | 100 | 60 | | 100 | 100 |
| | Adhesion to oily surface (MPa) | 2.2 | 2.1 | 2.2 | 2.1 | 0.1 | 0.1 | 0.2 | | 0.9 | 0.6 |
| | Coefficient of cohesive failure on oily surface (%) | 100 | 100 | 100 | 100 | 0 | 0 | 0 | | 0 | 0 |

TABLE 1-continued

|  |  | Example | | | | Comparative Example | | | | | |
|---|---|---|---|---|---|---|---|---|---|---|---|
|  |  | 1 | 2 | 3 | 4 | 1 | 2 | 3 | 4 | 5 | 6 |
| Engine oil resistance (120° C./ 10 days) | Hardness (Durometer A) | 27 | 20 | 22 | 20 | 5 | 10 | 20 | Not measurable | 8 | 17 |
|  | Elongation at break (%) | 360 | 360 | 340 | 350 | 700 | 300 | 250 |  | 500 | 330 |
|  | Tensile strength (MPa) | 2.2 | 2.1 | 2.1 | 1.9 | 1.5 | 1.0 | 2.5 |  | 1.8 | 1.8 |
|  | Shear adhesive force (MPa) | 2.0 | 1.9 | 1.6 | 1.9 | 1.2 | 0.8 | 1.7 |  | 1.4 | 1.7 |
|  | Coefficient of cohesive failure (%) | 100 | 100 | 100 | 100 | 100 | 60 | 100 |  | 100 | 100 |
|  | Adhesion to oily surface (MPa) | 1.7 | 1.5 | 1.8 | 1.5 | 0.2 | 0.2 | 0.3 |  | 0.1 | 0.6 |
|  | Coefficient of cohesive failure on oily surface (%) | 100 | 100 | 100 | 100 | 0 | 0 | 0 |  | 0 | 0 |

The present invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

Japanese Patent Application No. 2008-205059 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An oily surface adhesive room temperature curing organopolysiloxane composition, comprising:
(A) 100 parts by weight of at least one selected from the group consisting of organopolysiloxanes represented by the following formulas (1) to (4),

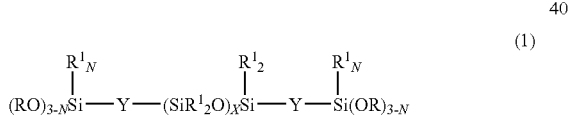

wherein R is a methyl or ethyl group, $R^1$ is an unsubstituted or substituted monovalent hydrocarbon group of 1 to 10 carbon atoms, X is an integer of at least 10, Y is an oxygen atom or an alkylene group of 1 to 5 carbon atoms, and numbers N are each independently an integer of 0 or 1,

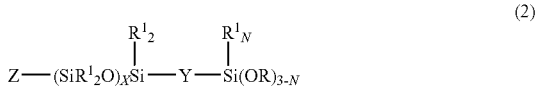

wherein R, $R^1$, X, Y, and N are the same as above, and Z is an alkenyl group of 2 to 5 carbon atoms,

wherein R, $R^1$, X, Y and N are the same as above, d is an integer of 1 to 10, and $R^2$ is a branched group containing a hydrolyzable group represented by the following formula,

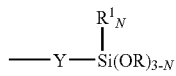

wherein R, $R^1$, Y and N are the same as above,

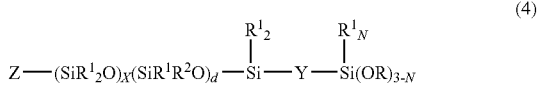

wherein R, $R^1$, $R^2$, X, Y, Z, N and d are the same as above;
(B) 10 to 150 parts by weight of a heavy calcium carbonate surface treated with at least one of a fatty acid and a paraffin treating agent;
(C) 1 to 30 parts by weight of an oil-absorbing carbon powder;
(D) 1 to 25 parts by weight of a silane represented by the following formula (5),

wherein $R^3$ is independently an unsubstituted or substituted monovalent hydrocarbon group, K is a hydrolyzable group, and n is an integer of 3 or 4, or a partial hydrolyzate;
(E) 0.01 to 15 parts by weight of a curing catalyst; and
(F) 0.1 to 10 parts by weight of at least one organic compound selected from the group consisting of ethyl isocyanate, isopropyl isocyanate, propyl isocyanate, butyl isocyanate, sec-butyl isocyanate, tert-butyl isocyanate, phenyl isocyanate, benzyl isocyanate, cyclopentyl isocyanate and p-tolyl isocyanate; and
wherein the composition comprises a mixture of organopolysiloxanes of formula (1) and (2) wherein the organopolysiloxane of formula (2) is present in an amount of no more than 30% by weight based on the total amount of the organopolysiloxanes of component (A).

2. The room temperature curing organopolysiloxane composition according to claim 1, wherein said oil-absorbing carbon powder of component (C) is an acetylene black powder having an average particle diameter of 30 to 50 nm, a specific surface area of 30 to 80 m²/g according to BET-$N_2$ adsorption method, and a DBP oil absorption of 130 to 200 ml/100 g.

3. The room temperature curing organopolysiloxane composition according to claim 1, further comprising (G) 0.1 to 100 parts by weight of a non-reactive silicone oil based on 100 parts by weight of component (A).

4. A seal obtained by curing the room temperature curing organopolysiloxane composition according to claim 1.

5. The room temperature curing organopolysiloxane composition according to claim 1, wherein the organopolysiloxane of formula (1) $R^1$ is methyl or ethyl and Y is an oxygen atom or an ethylene group.

6. The room temperature curing organopolysiloxane composition according to claim 1, further comprising the organopolysiloxane of formula (3) wherein $R^1$ is methyl or ethyl and Y is an oxygen atom or an ethylene group.

7. The room temperature curing organopolysiloxane composition according to claim 1, wherein component (B) is a heavy calcium carbonate surface treated with a paraffin treating agent.

8. The room temperature curing organopolysiloxane of claim 1, wherein component (C) is an acetylene black powder.

9. The room temperature curing organopolysiloxane composition according to claim 1, wherein component (A) comprises a dimethylpolysiloxane terminated by trimethoxysilyl groups, wherein each trimethoxysilyl group is connected to the dimethylpolysiloxane backbone by way of an ethylene group,
component (B) is a heavy calcium carbonate surface treated with a paraffin treating agent, and
component (C) is an acetylene carbon black.

10. The room temperature curing organopolysiloxane composition according to claim 1, wherein component (A) comprises a dimethylpolysiloxane terminated by trimethoxysilyl groups, wherein each trimethoxysilyl group is connected to the dimethylpolysiloxane backbone by way of an ethylene group and a dimethylpolysiloxane terminated by trimethylsilyl groups at both ends of the dimethylpolysiloxane backbone,
component (B) is a heavy calcium carbonate surface treated with a paraffin, and
component (C) is an acetylene carbon black.

11. The room temperature curing organopolysiloxane composition according to claim 1 having an adhesion to oily surface of 1.5 to 1.8 MPa engine oil resistance at 120° C. for 10 days according to JIS K6850.

12. The room temperature curing organopolysiloxane composition according to claim 1, wherein the oily surface comprises one or more oils in an amount of 5-7 g/m².

13. The room temperature curing organopolysiloxane composition according to claim 1, wherein the oily surface is a surface comprising at least one oil.

14. The room temperature curing organopolysiloxane composition according to claim 1, comprising one or more chemicals having a thiourethane bond.

15. The room temperature curing organopolysiloxane composition according to claim 1, wherein the organic compound (F) is present in an amount of 0.5 to 5 parts by weight.

16. The room temperature curing organopolysiloxane composition of claim 1, having a coefficient of cohesive failure on oily surface of 100% according to JIS K6850 for engine oil resistance at 120° C. for 10 days.

17. An oily surface adhesive room temperature curing organopolysiloxane composition, comprising:
(A) 100 parts by weight of at least one selected from the group consisting of organopolysiloxanes represented by the following formulas (1) to (4),

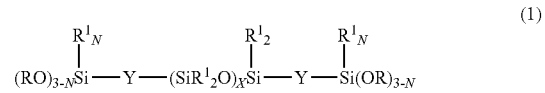

wherein R is a methyl or ethyl group, $R^1$ is an unsubstituted or substituted monovalent hydrocarbon group of 1 to 10 carbon atoms, X is an integer of at least 10, Y is an oxygen atom or an alkylene group of 1 to 5 carbon atoms, and numbers N are each independently an integer of 0 or 1,

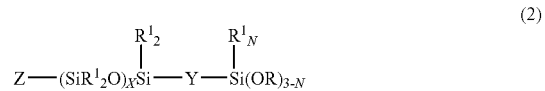

wherein R, $R^1$, X, Y, and N are the same as above, and Z is an alkenyl group of 2 to 5 carbon atoms,

wherein R, $R^1$, X, Y and N are the same as above, d is an integer of 1 to 10, and $R^2$ is a branched group containing a hydrolyzable group represented by the following formula,

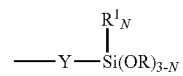

wherein R, $R^1$, Y and N are the same as above,

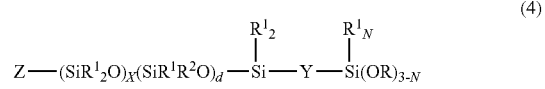

wherein R, $R^1$, $R^2$, X, Y, Z, N and d are the same as above;
(B) 10 to 150 parts by weight of a heavy calcium carbonate surface treated with at least one of a fatty acid and a paraffin treating agent;
(C) 1 to 30 parts by weight of an oil-absorbing carbon powder;
(D) 1 to 25 parts by weight of a silane represented by the following formula (5), $$R^3{}_{4-n}SiK_n \qquad (5)$$

wherein $R^3$ is independently an unsubstituted or substituted monovalent hydrocarbon group, K is a hydrolyzable group, and n is an integer of 3 or 4, or a partial hydrolyzate;
(E) 0.01 to 15 parts by weight of a curing catalyst; and
(F) 0.1 to 10 parts by weight of at least one organic compound selected from the group consisting of ethyl isocyanate, isopropyl isocyanate, propyl isocyanate, butyl isocyanate, sec-butyl isocyanate, tert-butyl isocyanate, phenyl isocyanate, benzyl isocyanate, cyclopentyl isocyanate and p-tolyl isocyanate; and
wherein the composition comprises a mixture of organopolysiloxanes of formula (4) and (3), wherein the amount of the organopolysiloxane of formula (4) is not more than 30 wt. % based on the total amount of the organopolysiloxanes of component (A).

18. The room temperature curing organopolysiloxane composition of claim 17, wherein said oil-absorbing carbon powder of component (C) is an acetylene black powder having an average particle diameter of 30 to 50 nm, a specific surface area of 30 to 80 m$^2$/g according to BET-N$_2$ adsorption method, and a DBP oil absorption of 130 to 200 ml/100 g.

19. The room temperature curing organopolysiloxane composition of claim 17, further comprising (G) 0.1 to 100 parts by weight of a non-reactive silicone oil based on 100 parts by weight of component (A).

20. A seal obtained by curing the room temperature curing organopolysiloxane composition of claim 17.

21. The room temperature curing organopolysiloxane composition of claim 17, wherein the organopolysiloxane of formula (3) R$^1$ is methyl or ethyl and Y is an oxygen atom or an ethylene group.

22. The room temperature curing organopolysiloxane composition of claim 17, wherein component (B) is a heavy calcium carbonate surface treated with a paraffin treating agent.

23. The room temperature curing organopolysiloxane of claim 17, wherein component (C) is an acetylene black powder.

24. The room temperature curing organopolysiloxane composition of claim 17, wherein component (A) comprises a dimethylpolysiloxane terminated by trimethoxysilyl groups, wherein each trimethoxysilyl group is connected to the dimethylpolysiloxane backbone by way of an ethylene group,
  component (B) is a heavy calcium carbonate surface treated with a paraffin treating agent, and
  component (C) is an acetylene carbon black.

25. The room temperature curing organopolysiloxane composition of claim 17, wherein component (A) comprises a dimethylpolysiloxane terminated by trimethoxysilyl groups, wherein each trimethoxysilyl group is connected to the dimethylpolysiloxane backbone by way of an ethylene group and a dimethylpolysiloxane terminated by trimethylsilyl groups at both ends of the dimethylpolysiloxane backbone,
  component (B) is a heavy calcium carbonate surface treated with a paraffin, and
  component (C) is an acetylene carbon black.

26. The room temperature curing organopolysiloxane composition of claim 17 having an adhesion to oily surface of 1.5 to 1.8 MPa engine oil resistance at 120° C. for 10 days according to JIS K6850.

27. The room temperature curing organopolysiloxane composition of claim 17, wherein the oily surface comprises one or more oils in an amount of 5-7 g/m$^2$.

28. The room temperature curing organopolysiloxane composition of claim 17, wherein the oily surface is a surface comprising at least one oil.

29. The room temperature curing organopolysiloxane composition of claim 17, comprising one or more chemicals having a thiourethane bond.

30. The room temperature curing organopolysiloxane composition of claim 17, wherein the organic compound (F) is present in an amount of 0.5 to 5 parts by weight.

31. The room temperature curing organopolysiloxane composition of claim 17, having a coefficient of cohesive failure on oily surface of 100% according to JIS K6850 for engine oil resistance at 120° C. for 10 days.

* * * * *